3,097,946
EDIBLE LOW CALORIE COMPOSITION AND
PROCESS OF PRODUCTION
Robert F. Menzi, Geneva, Switzerland, assignor to Dr. A. Wander, S.A., Bern, Switzerland, a corporation of Switzerland
No Drawing. Filed Sept. 14, 1960, Ser. No. 55,844
Claims priority, application Switzerland Sept. 16, 1959
19 Claims. (Cl. 99—1)

The present invention relates generally to an edible composition of matter and more particularly to an edible flour having a low calorie content for use in the preparation of dietetic foods and to a process for the preparation thereof.

Among the diseases which make it imperative for the patient to observe a strict dietary regimen, diabetes and obesity are the most unpleasant. The diabetic's diet should be more or less free from glucose-containing foods, whereas in obesity only a limited number of calories should be absorbed. Hence, sugar and starchy food products, primarily confectionery and bakery products prepared from conventional flour, must be excluded from the diet.

As a sweetener, sugar can easily be substituted by non-caloric chemical sweetening agents, such as saccharine, cyclamate, and the like. On the other hand, no product is known to be capable of satisfactorily replacing the starch polysaccharide for use in food products which is not converted into glucose or other assimilable sugars during the digestive process.

There are many polysaccharides which do not release assimilable sugars during digestion following ingestion by living animals, including humans. In this group of polysaccharides, for example, belong the polysaccharides composed of non-assimilable sugars, the polysaccharides that are composed of assimilable sugars but which cannot be broken down, and, lastly, the polysaccharides that are composed of non-assimilable sugars and which cannot be broken down. While natural starch is insoluble at low temperature and merely swells by absorbing water at 60°–70° C., the foregoing polysaccharides often dissolve readily in cold water forming gels or highly viscous pastes which are very unpleasant to the taste, and therefore are unsuitable for the manufacture of food products.

It has now been found that these polysaccharides which do not yield assimilable sugars during the digestive process, when suitably treated by the process of the present invention, become insoluble in cold water, and merely swell in warm water by water absorption in the same manner as natural starch and, when mixed with the suitable binding agent, yield a flour which is eminently suitable for production of food stuffs.

The process of the present invention is characterized by the preparation of a substantially homogeneous mixture, in the presence of or with the subsequent addition of a liquid to form a paste consistency, of at least one polysaccharide which does not yield assimilable sugar during digestion with at least one protein which becomes insoluble under the action of heat. The paste thus produced is preferably formed into bodies having a large surface area and then dried and heated to a temperature between about 100° C. and 250° C. The drying and heating is, of course, terminated before any impairment of the edibility properties of the product results. The resultant polysaccharide-protein product is thereafter ground and, when the occasion arises, mixed with at least one edible binding agent which holds the polysaccharide-protein in an agglutinated form, such as a protein having the physical properties of gluten, to produce an edible flour. The polysaccharide which does not release assimilable sugar during digestion is perferably mixed with an aqueous mixture of the protein which becomes insoluble under the action of heat to form a substantially homogeneous mixture having the consistency of a paste.

A quantity of protein which becomes insoluble under the action of heat ranging from about 2% to 15% by weight of the total solids is sufficient to achieve the desired results. This low protein requirement is astonishing and naturally of considerable practical importance because a product having a high protein content would to some extent lose its value as a dietetic flour. The protein which becomes insoluble under the action of heat is preferably used in quantities ranging from about 3% to 10%, by weight, but preferably in quantities of about 5%.

The lowering of the water solubility of the polysaccharides which do not release assimilable sugar is effected by mixing them with a solution of at least one protein which becomes insoluble under the action of heat. The drying and heating of a mixture of this kind makes the protein become insoluble and then brings about the formation of a net of protein insolubilized in situ inside the polysaccharide mass. Further, the free amine groups of the protein react with the sugar moieties of the polysaccharide in accordance with Maillard's reaction, forming new insoluble macromolecules. There are thus obtained, depending upon the quantity and kind of the protein used as well as on the temperature and duration of the heating, products which have limited water solubility at low temperature but which swell in warm water by water absorption. If, after grinding, such products are mixed with an edible binding agent, such as a protein which possesses the physical properties of gluten, there is obtained a flour with a low calorie content which can be used for the production of dietetic food products in the conventional manner.

As polysaccharides, any number of substances of the above mentioned three types can be employed. As a polysaccharide which is composed of non-assimilable sugars, polymannan, carubin, guar, agar, alginate, polygalactane or pectin, for example, can be used. Certain soluble cellulose derivatives may be used as non-decomposable polysaccharides composed of assimilable sugars, for example cellulose, inuline, dextran, caragenate, chitine. As a polysaccharide which is composed of non-assimilable sugars and is not broken down, one may use for example carboxymethylcellulose, methylcellulose, ethylhydroxyethylcellulose or tragacanth.

Carubin, that is, carob seed flour, is of great practical importance as a source of polysaccharide. It has been found that the most satisfactory results are obtained with this cheap starting material only when it has previously been subjected to weak acid hydrolysis. Hydrolysis can be performed with an aqueous carubin paste or with a suspension of carubin in ethanol, isopropyl alcohol, acetone or any other suitable solvent which can be easily removed. Hydrochloric acid or any other strong acid is added as required to this paste or suspension and the latter heated until the desired degree of hydrolysis is reached, whereupon it is neutralized with a base, such as a sodium hydroxide solution or soda solution, and if necessary the solvent is removed.

As a protein which becomes insoluble under the action of heat, a great many animal or vegetable protein can be used. Among the former, ovalbumin is very suitable. Among the latter, soya bean or ground-nut protein can, for example, be employed.

As a binding agent, cereal glutens, such as corn gluten, or any other protein which has similar physical properties, such as soya protein, can be employed. The binding agent is employed in a proportion in the range of between about 10 and 20 percent by weight of the composition.

*Example 1*

95 parts of highly viscous carboxymethylcellulose are mixed by kneading with an aqueous solution containing 395 parts of water and 5 parts of ovalbumin. The paste thus obtained is extruded in "spaghetti" form, and first dried in this form at 40° C. for 5 hours and then heated in an oven to 200° C. for 8 minutes. The product thus obtained is ground and mixed with 20 parts of dry corn gluten to form a flour. This flour can be used for the production of dietetic food products, such as wafers, cookies, bread, and the like, as with conventional wheat flour or other cereal flours.

*Example 2*

95 gm. of carubin flour are kneaded to a paste with a mixture of 250 ml. of water and 5 ml. of 37% hydrochloric acid. The paste is heated to 80° C. for 75 minutes and then neutralized to pH 6.5 by adding 2.3 gm. of caustic soda in 20 ml. of water. 5 gm. of ground-nut protein in 30 ml. of water are added directly or after previous drying to the paste, which is then dried and heated to 200° C. for 3 minutes. The product thus obtained is further treated as in Example 1.

*Example 3*

100 gm. of carubin are suspended in 200 ml. of ethanol and 5 ml. of 37% of hydrochloric acid are added. The suspension is heated, while stirring, to the reflux temperature (80° C.) for 2 hours. It is then filtered, the residue is washed 3 times with 50-ml. portions of ethanol and dried at 60° C. The fluor thus obtained is further processed in the way described in Example 1, using ovalbumin.

Others may practice the invention in any of the numerous ways which are suggested to one skilled in the art, by this disclosure, and all such practice of invention are considered to be a part hereof which fall within the scope of the appended claims.

I claim:

1. A solid edible composition of matter having a low calorie content which comprises, a polysaccharide which is incapable of yielding an assimilable sugar during digestion after ingestion by humans having dispersed therethrough between about 2 and 15 percent by weight of a protein which has been converted in situ to an insoluble form by heat and said polysaccharide being held by a net of said protein extending throughout said polysaccharide, and said protein having amine groups thereof reacted with sugar moieties of said polysaccharide to form insoluble macromolecules of the polysaccharide-protein composition.

2. A composition of matter as in claim 1 wherein the polysaccharide is carboxymethylcellulose.

3. A composition of matter as in claim 1 wherein the polysaccharide is polymannan.

4. A composition of matter as in claim 1 wherein the polysaccharide is carubin which has been subjected to a weak acid hydrolysis.

5. A composition of matter as in claim 1 wherein the protein is ovalbumin.

6. A composition of matter as in claim 1 wherein the protein is soya protein.

7. A composition of matter as in claim 1 wherein the protein is ground nut protein.

8. A solid edible flour composition having a low calorie content and adapted for use in the preparation of dietetic food products which comprises, a polysaccharide which is incapable of yielding an assimilable sugar during digestion after ingestion by humans having dispersed therethrough between about 2 and 15 percent by weight of a protein which has been converted in situ to an insoluble form by heat and said protein being in the form of a net extending throughout and holding said polysaccharide, said protein having amine groups thereof reacted with sugar moieties of said polysaccharides to form insoluble macromolecules of the polysaccharide-protein composition, and said polysaccharide-protein composition being finely subdivided and having uniformly dispersed therethrough between about 10 and 20 percent by weight of a finely divided edible gluten-like binding agent selected from the group consisting of corn gluten and soya protein whereby said polysaccharide-protein composition is maintained in an agglutinated form.

9. A composition as in claim 8 wherein the binding agent is soya protein.

10. A composition as in claim 8 wherein the binding agent is dry corn gluten.

11. A process for the production of an edible composition of matter with a low calorie content which comprises, preparing a solvent moistened substantially homogeneous mixture having the consistency of a paste of at least one polysaccharide which does not yield as assimilable sugar during the digestive process after ingestion by humans and at least one protein which becomes insoluble on heating, said protein being used in an amount of between about 2 and 15 percent of the total weight of said polysaccharide and said protein, and said solvent being selected from the group consisting of water, ethanol, isopropyl alcohol, and acetone, drying the said mixture to remove said solvent and heating at a temperature above the coagulation temperature of said protein, and terminating said heating before impairing the edible properties thereof.

12. A process as in claim 11 wherein the said mixture is dried at a temperature of about 40° C. and thereafter heated to a temperature of between about 100° C. and 250° C.

13. A process as in claim 11 wherein the polysaccharide is carboxymethylcellulose.

14. A process as in claim 11 wherein the polysaccharide is carubin which has been subjected to a weak acid hydrolysis.

15. A process as in claim 11 wherein the protein is ovalbumin.

16. A process as in claim 11 wherein the protein is ground nut protein.

17. A composition as in claim 11 wherein dry corn gluten is added as a binding agent.

18. A process for the production of an edible flour composition having a low calorie content which comprises, preparing a solvent moistened substantially homogeneous mixture of at least one soluble polysaccharide which does not yield an assimilable sugar during the digestive process after ingestion by humans and at least one soluble protein which becomes insoluble on heating, said protein being used in an amount of between about 2 and 15 percent of the total weight of said polysaccharide and said protein, and said solvent being selected from the group consisting of water, ethanol, isoproply alcohol, and acetone, said mixture having the consistency of a paste, drying the said paste to remove said solvent and heating at a temperature above the coagulation temperature of said protein to form a polysaccharide-protein product of limited water solubility and terminating said heating before impairing the edible properties thereof, finely subdividing said polysaccharide-protein product, and admixing therewith between about 10 and 20 percent by weight of a finely divided edible gluten-like binding agent selected from the group consisting of corn gluten and soya protein, said polysaccharide-protein product being maintained thereby in an agglutinated form.

19. A process as in claim 18 wherein the binding agent comprises about 20% by weight of said composition.

References Cited in the file of this patent

UNITED STATES PATENTS

| | | |
|---|---|---|
| 1,751,267 | Darling | Mar. 18, 1930 |
| 2,038,633 | Bienenstock | Apr. 28, 1936 |

FOREIGN PATENTS

| | | |
|---|---|---|
| 388,319 | Great Britain | Feb. 23, 1933 |
| 10,524/32 | Australia | Dec. 12, 1933 |
| 745,926 | Great Britain | Mar. 7, 1956 |

OTHER REFERENCES

"Feeds and Feeding," 21st edition, 1951, Morrison, The Morrison Publishing Co. (Ithaca, N.Y.), page 29.

"Baking Science and Technology," vol. II, 1952, by Pyler, Siebel Publishing Co. (Chicago), page 411.